(12) United States Patent
Picard

(10) Patent No.: US 8,381,832 B1
(45) Date of Patent: Feb. 26, 2013

(54) COMBINATION DRYWALL SCREW GUN AND ROTARY SAW DEVICE

(76) Inventor: Christopher M. Picard, Auburn, MA (US)

( * ) Notice: Subject to any disclaimer, the term of this patent is extended or adjusted under 35 U.S.C. 154(b) by 206 days.

(21) Appl. No.: 12/769,560

(22) Filed: Apr. 28, 2010

(51) Int. Cl.
*B23B 27/12* (2006.01)

(52) U.S. Cl. .............................. 173/129; 173/50; 30/500

(58) Field of Classification Search .................. 173/129, 173/50; 408/17, 20; 144/1.1, 35.1; 30/276, 30/500
See application file for complete search history.

(56) References Cited

U.S. PATENT DOCUMENTS

| | | | | |
|---|---|---|---|---|
| 2,477,755 | A * | 8/1949 | Langfelder | 74/57 |
| 2,548,411 | A * | 4/1951 | Vache | 74/57 |
| 2,726,689 | A * | 12/1955 | Busby | 144/1.1 |
| 4,030,383 | A * | 6/1977 | Wagner | 81/54 |
| D276,883 | S | 12/1984 | Unger | |
| 4,905,423 | A * | 3/1990 | van Laere | 451/461 |
| 4,924,578 | A * | 5/1990 | Chagnon et al. | 30/500 |
| 4,949,463 | A * | 8/1990 | Chen | 30/500 |
| 5,033,552 | A * | 7/1991 | Hu | 173/217 |
| 5,061,126 | A * | 10/1991 | Cain et al. | 408/206 |
| 5,101,697 | A | 4/1992 | Fishback | |
| 5,224,230 | A * | 7/1993 | Vanicsek et al. | 7/158 |
| 5,224,803 | A * | 7/1993 | Lallier | 409/131 |
| 5,261,135 | A * | 11/1993 | Mitchell | 7/158 |
| 5,624,213 | A | 4/1997 | Anderson | |
| 6,176,322 | B1 * | 1/2001 | Wadge | 173/217 |
| 6,881,017 | B1 | 4/2005 | Krecek et al. | |
| D526,178 | S | 8/2006 | Alias | |
| 7,143,841 | B2 * | 12/2006 | Etter et al. | 173/170 |
| 7,168,897 | B2 * | 1/2007 | Baber | 409/180 |
| 2004/0029508 | A1 * | 2/2004 | Robson et al. | 451/358 |
| 2008/0226407 | A1 * | 9/2008 | Bauman | 408/239 R |

* cited by examiner

*Primary Examiner* — M. Alexandra Elve
*Assistant Examiner* — Nathaniel Chukwurah

(57) ABSTRACT

A combination drywall screw gun and rotary saw device kit featuring a base that has a body, a handle with a trigger, and a drive shaft connected to a motor. The kit has a screw attachment component that functions to install screws that has a screw bit, a shaft lock, a screw drive shaft, a depth guide, and a collet nut. The screw attachment component can be attached to and removed from the base using an attachment means. The kit has a saw attachment component that functions as a rotary saw that has a saw component and a saw drive shaft. The saw attachment component can be attached to and removed from the body portion of the base using the attachment means The kit has a wrench piece for engaging the collet nut to tighten or loosen the screw bit.

8 Claims, 3 Drawing Sheets

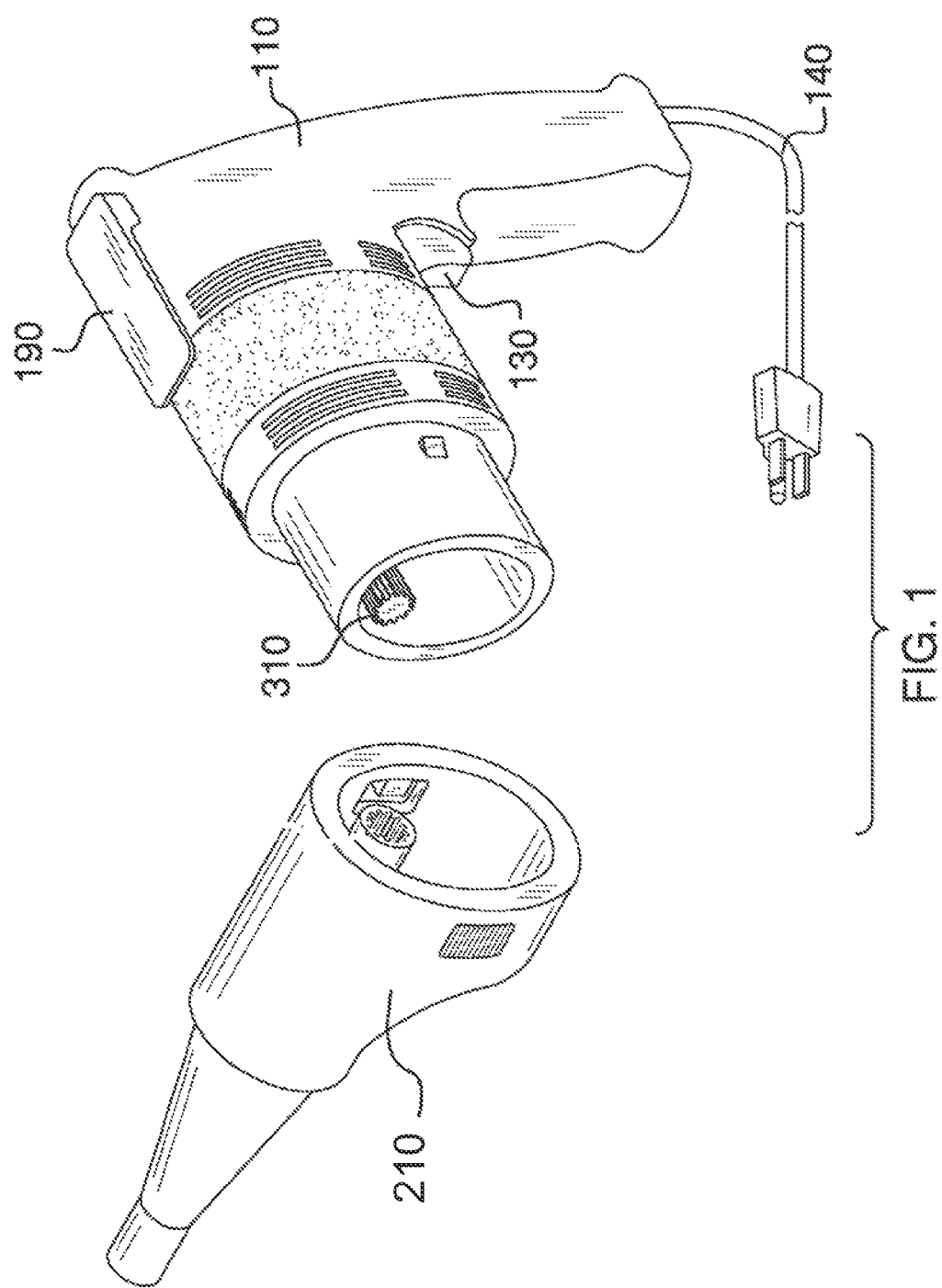

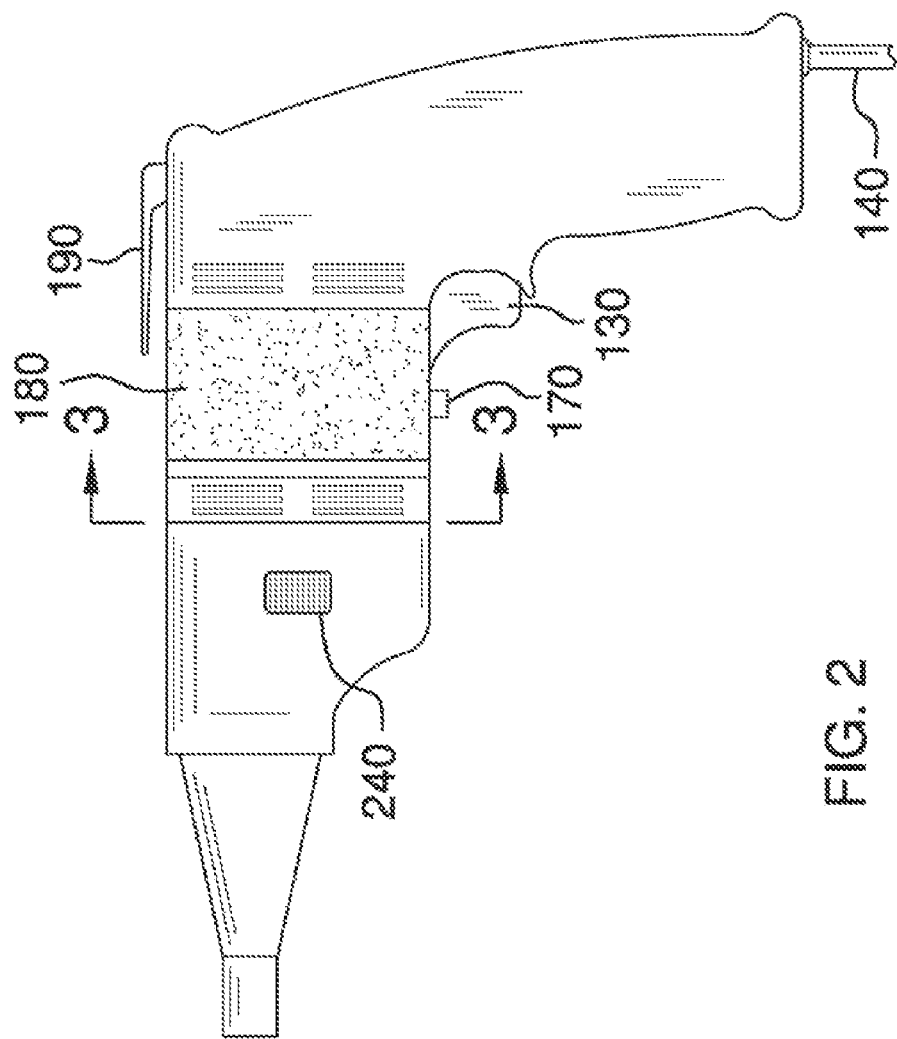
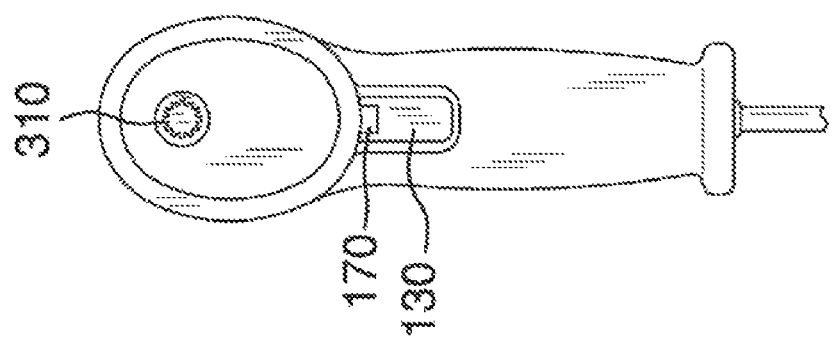

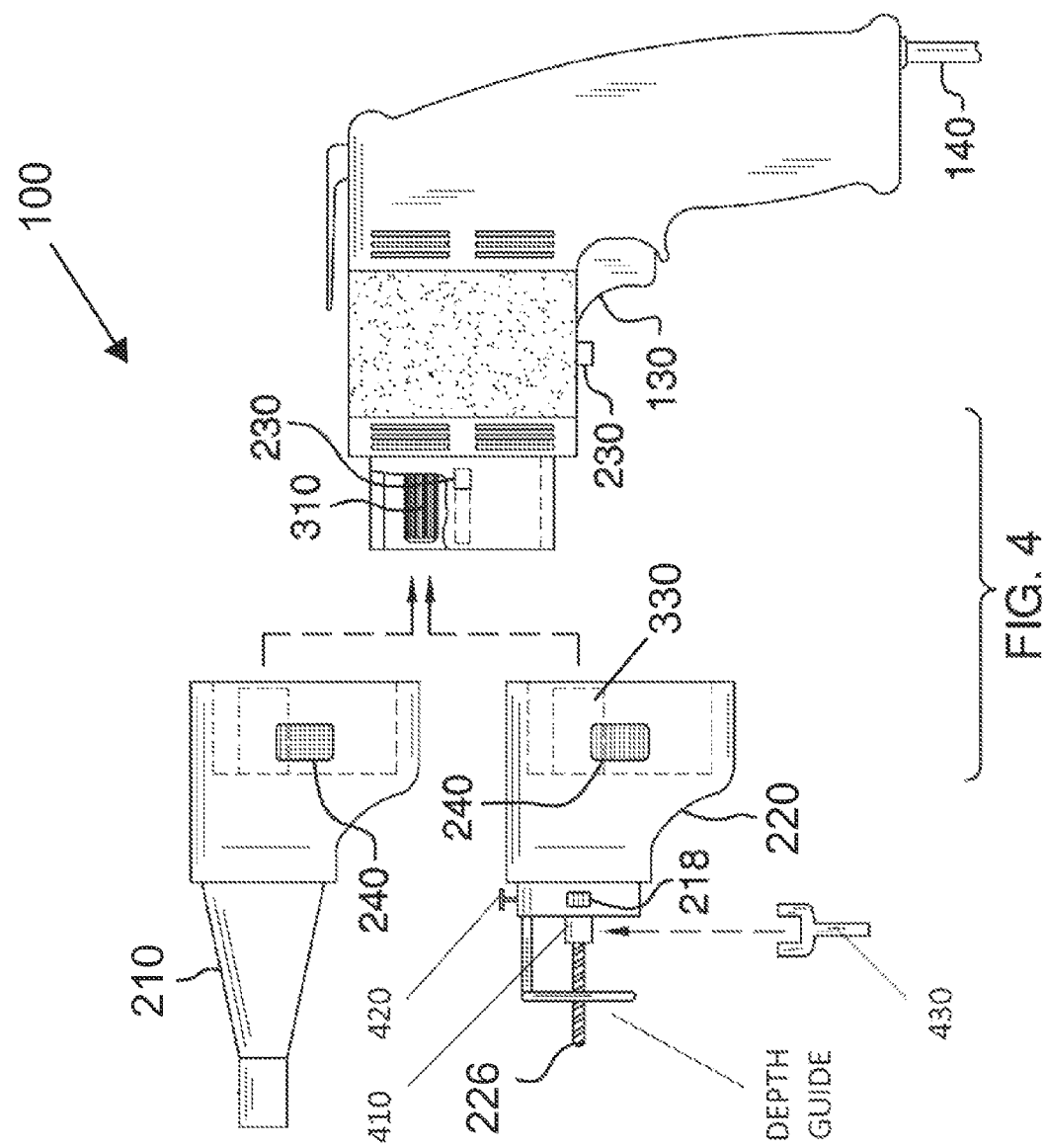

COMBINATION DRYWALL SCREW GUN AND ROTARY SAW DEVICE

FIELD OF THE INVENTION

The present invention is directed to an electrical tool, more particularly to a tool that can allow a user to both secure a drywall panel to framing studs and cut holes in the drywall for electrical boxes.

BACKGROUND OF THE INVENTION

Standard installation of drywall panels generally involves using a standard screw gun to secure the drywall panel to the framing studs of a residence or building (e.g., via drywall screws). Cutting a hole in a drywall panel for an electrical box requires a separate tool (e.g., a rotary saw such as a Roto-zip® or similar device). The present invention features a combination drywall screw gun and rotary saw device that allows a user to both secure a drywall panel to framing studs (e.g., via drywall screws) and cut holes in the drywall for electrical boxes. The tool of the present invention allows a user to carry only one tool to jobsites, which provides extra room in his/her toolbox (e.g., less clutter with cords, etc.).

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is an exploded view of the combination drywall rotary saw device of the present invention.

FIG. 2 is a side view of the combination drywall screw gun and rotary saw device of FIG. 1.

FIG. 3 is a front view of the combination drywall screw gun and rotary saw device of FIG. 1.

FIG. 4 is a second exploded view of the combination drywall screw gun and rotary saw device of FIG. 1.

DESCRIPTION OF PREFERRED EMBODIMENTS

Referring now to FIGS. 1-4, the present invention features a combination drywall screw gun and rotary saw device 100 that allows a user to both secure a drywall panel to framing studs (e.g., via drywall screws) and cut holes in the drywall for electrical boxes. The device 100 of the present invention may come in the form of a kit.

The device 100 of the present invention comprises a base 110 similar to bases of screw guns, drills, rotary saws, etc. For example, the base 110 has a handle with a trigger 130 and a body portion. A power cord 140 (e.g., between about 4 to 6 feet or more) extends outwardly from the base 110 (e.g., the handle). The handle comprises a first grip for comfortably gripping the device 100. In some embodiments, a second grip 180 is disposed on the body of the base 110 (see FIG. 2). In some embodiments, a clip 190 is disposed on the base 110 (e.g., the body) for hanging the device 100 as needed.

The device 100 of the present invention further comprises a screw attachment component 210 that functions as a screw gun to install dry wall screws and a saw attachment component 220 that functions as a rotary saw. Screw guns and rotary saws are well known to one of ordinary skill in the art. For example, a screw gun comprises a screw bit and in some embodiments, a shaft lock 218. In some embodiments, the screw bit has a diameter of about ⅛ inch, ¼ inch, or 5/32 inch. The screw bit is not limited to these dimensions. The screw attachment component 210 further comprises a depth guide (see FIG. 4), with a depth guide latch 420 for example. The saw attachment component 220 further comprises a depth guide (see FIG. 4), with a depth guide latch 420 for example. Depth guides are well known to one of ordinary skill in the art. In some embodiments, a collet nut 410 is disposed on the screw attachment component 210 (e.g., engaging the screw bit 216). In some embodiments, a collet nut 410 is disposed on the saw attachment component 220 (e.g., engaging the saw component 226). Collet nuts are well known to one of ordinary skill in the art. The device 100 may come with a wrench piece 430 that can be used on the collet nut 410 to tighten or loosen the screw bit 216' e.g., while holding down the shaft lock 218. The device 100 may come with a wrench piece 430 that can be used on the collet nut 410 to tighten or loosen the saw component 226, e.g., while holding down the shaft lock 218.

A rotary saw comprises a saw component 226. FIG. 1 shows an example of a saw attachment component 220, and FIG. 4 shows an example of both attachment components 210, 220. The attachment components 210, 220 can be removably attached (e.g., via an attachment means) to the body portion of the base 110 as needed for the appropriate task. For example, the body has a male attachment surface that engages a female attachment surface disposed on the attachment component 210, 220. In some embodiments, the attachment components 210, 220 can snap onto the body of the base 110. In some embodiments, a lock-release system 230 secures the attachment components to the base 110 (see FIG. 4). A button 240 causes the lock-release system to release the attachment component from the base 110. The present invention is not limited to the aforementioned attachment means.

A drive shaft 310 is disposed in the base 110 and extends outwardly from the body of the base 110. Drive shafts are well known to one of ordinary skill in the art. The drive shaft 310 is operatively connected to a motor, which is operatively connected to a power source (e.g., an electrical outlet via the plug 140). When activated (e.g., via the trigger 130), the drive shaft rotates. In some embodiments, the drive shaft 310 is operatively connected to a speed tab 170, which controls the speed at which the drive shaft 310 rotates. Speed tabs are well known to one of ordinary skill in the art. For example, in some embodiments, the device can be operated at a first speed for first application and a second speed for second application (or more speeds, etc.) via the speed tab 170.

The drive shaft 310 can engage a screw drive shaft disposed in the screw attachment component 210 when the screw attachment component 210 is attached to the base 110. The drive shaft can engage a saw drive shaft 330 disposed in the saw attachment component 220 when the saw attachment component 220 is attached to the base 110.

The device 100 of the present invention may be constructed in a variety of colors and combinations of colors. For example, in some embodiments, the device 100 is constructed having components colored grey, black, green-yellow, silver, the like, or a combination thereof. The present invention is not limited to the aforementioned colors.

The following the disclosures of the following U.S. Patents are incorporated in their entirety by reference herein: U.S.

Pat. No. 5,224,803; U.S. Pat. No. 5,224,230; U.S. Pat. No. 5,624,213; U.S. Pat. No. 5,101,697; U.S. Pat. No. 5,061,126; U.S. Pat. No. 6,881,017.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An interchanging drywall screw gun and rotary saw device kit consisting of:
   (a) a base consisting of a body portion with a handle with a trigger, the base further consisting of a drive shaft extending outwardly from the body portion of the base, the drive shaft is operatively connected to a motor, wherein when the motor is activated via the trigger the drive shaft rotates, wherein the body consists of a male attachment surface for attaching an attachment component;
   (b) an interchanging screw attachment component that functions to install screws, the screw attachment component consists of a screw bit engaged with a shaft lock and screw drive shaft, a depth guide with depth guide latch, and a collet nut engaging the screw bit, wherein the screw attachment component can be removably and interchangeably attached to the body portion of the base via an attachment means such that the screw drive shaft engages the drive shaft of the base, wherein the screw attachment component consists of a female attachment surface for attaching to the male attachment surface on the body, wherein the attachment means consists of a lock-release system and a release button;
   (c) an interchanging saw attachment component that functions as a rotary saw, the saw attachment component consists of a saw component engaged with a saw drive shaft, wherein a terminating end of the saw component does not engage another component but extends out and away from the saw attachment component, wherein the saw attachment component can be removably and interchangeably attached to the body portion of the base via the attachment means such that the saw drive shaft engages the drive shaft of the base, wherein the saw attachment component consists of a female attachment surface for attaching to the male attachment surface on the body, wherein the attachment means consists of a lock-release system and a release button; and
   (d) a wrench piece for engaging the collet nut to tighten or loosen the screw bit.

2. An interchanging drywall screw gun and rotary saw device kit comprising:
   (a) a base comprising a body portion with a handle with a trigger, the base further comprising a drive shaft extending outwardly from the body portion of the base, the drive shaft is operatively connected to a motor, wherein when the motor is activated via the trigger the drive shaft rotates, wherein the body comprises a male attachment surface for attaching an attachment component;
   (b) an interchanging screw attachment component that functions to install screws, the screw attachment component comprises a screw bit engaged with a shaft lock and screw drive shaft, a depth guide with depth guide latch, and a collet nut engaging the screw bit, wherein the screw attachment component can be removably and interchangeably attached to the body portion of the base via an attachment means such that the screw drive shaft engages the drive shaft of the base, wherein the screw attachment component comprises a female attachment surface for attaching to the male attachment surface on the body, wherein the attachment means comprises a lock-release system and a release button;
   (c) an interchanging saw attachment component that functions as a rotary saw, the saw attachment component comprises a saw component engaged with a saw drive shaft, wherein a terminating end of the saw component does not engage another component but extends out and away from the saw attachment component, wherein the saw attachment component can be removably and interchangeably attached to the body portion of the base via the attachment means such that the saw drive shaft engages the drive shaft of the base, wherein the saw attachment component comprises a female attachment surface for attaching to the male attachment surface on the body, wherein the attachment means comprises a lock-release system and a release button; and
   (d) a wrench piece for engaging the collet nut to tighten or loosen the screw bit.

3. The kit of claim 2, wherein the handle of the base comprises a first grip for comfortably gripping the device.

4. The kit of claim 2, wherein the body of the base comprises a second grip for comfortably gripping the device.

5. The kit of claim 2, wherein a clip is disposed on the base for hanging the device as needed.

6. The kit of claim 2, wherein the base further comprises a power cord operatively connected to the motor.

7. The kit of claim 2, wherein the screw bit has a diameter of about ⅛ inch, ¼ inch, or 5/32 inch.

8. The kit of claim 2, wherein the drive shaft of the base is operatively connected to a speed tab, which controls speeds at which the drive shaft rotates.

* * * * *